United States Patent [19]

Dandurand

[11] Patent Number: 4,899,451
[45] Date of Patent: Feb. 13, 1990

[54] SOLAR COMPASS AND TIME INDICATOR DEVICE

[76] Inventor: Jean-Pierre Dandurand, 281 D'Anjou Blvd., Châteauguay, Quebec, Canada, J6J 2R4

[21] Appl. No.: 180,206
[22] Filed: Apr. 11, 1988
[51] Int. Cl.⁴ .............................................. G01C 17/34
[52] U.S. Cl. ........................................ 33/269; 33/271
[58] Field of Search ............... 33/271, 270, 269, 1 SD

[56] References Cited

U.S. PATENT DOCUMENTS

| | | | |
|---|---|---|---|
| 963,597 | 7/1910 | Lessells | 33/269 |
| 1,258,160 | 3/1918 | Slater | 33/271 |
| 1,587,413 | 6/1926 | Pond | 33/271 |
| 2,408,571 | 10/1946 | Mitchell | 33/1 SD |
| 2,532,324 | 12/1950 | Milligan | 33/269 |
| 4,512,085 | 4/1985 | Liddell | 33/269 |

*Primary Examiner*—William A. Cuchlinski, Jr.
*Assistant Examiner*—Christ. Fulton

[57] ABSTRACT

A solar compass device having a first disc member provided spaced apart time markings indicative of the time of day and disposed in a counterclockwise direction in a circular ring pattern thereon. A second disc member is rotatably displaceable with respect to the first disc member to permit rotational displacement between the first and second disc members with the members disposed in substantially parallel planes. A single fixed indicating marking is provided on the second disc member and aligned with a south end of a north-south radius passing through a center point relative to the ring, and the ring. In operation, the first disc member is oriented with one of the 12 o'clock marking, aligned substantially in the direction of the sun, with the fixed indicating means having been aligned with a marking indicative of approximately the time of day. With the discs so oriented, the north end of the radius is automatically aligned in the direction of the north pole.

21 Claims, 2 Drawing Sheets

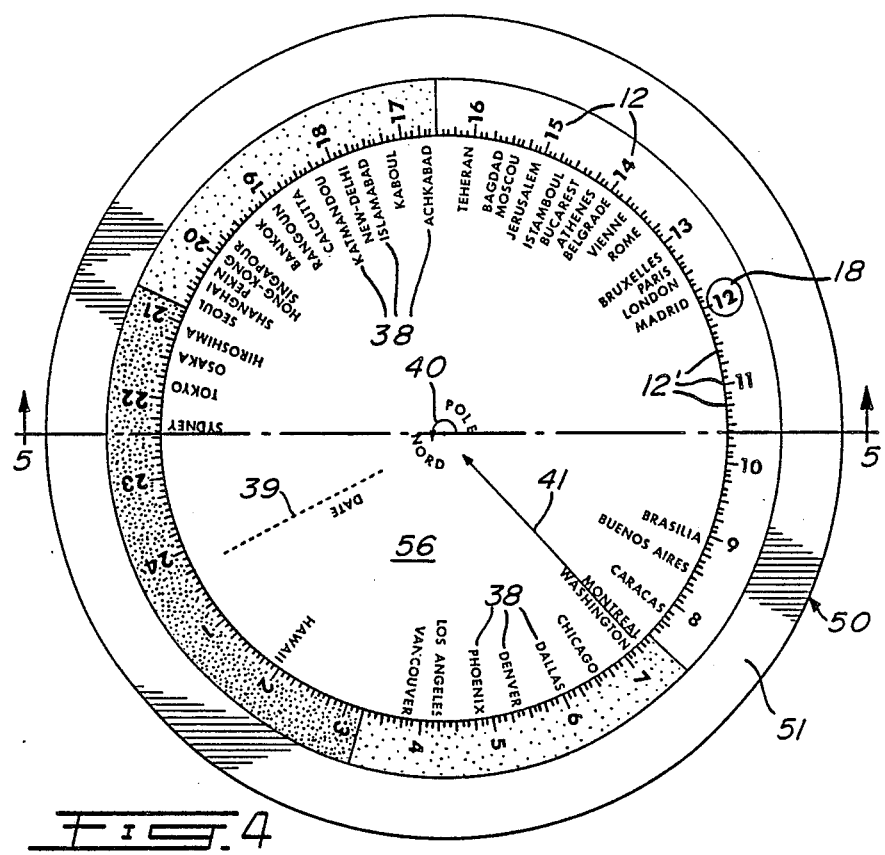
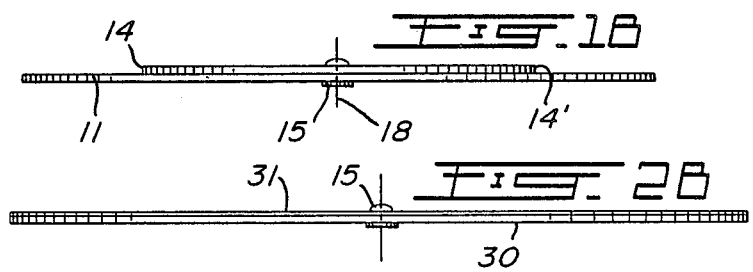
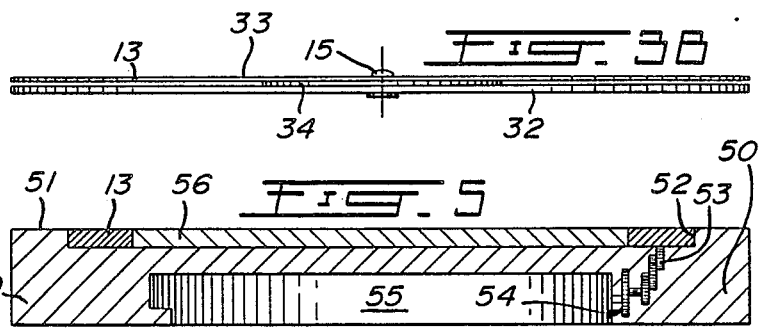

SOLAR COMPASS AND TIME INDICATOR DEVICE

BACKGROUND OF INVENTION (a) Field of Invention

The present invention relates to a novel compass device wherein at least two flat disc members are secured to one another with one of the members having spaced apart markings indicative of time and disposed in a counterclockwise direction and the second member having an indicating means aligned on a radius between a center point relative to the ring so that the north pole can be detected by orienting a 12 o'clock marking on the ring with the sun. Simultaneously the time of day can also be ascertained in major cities of the world as the compass device may also be used as a time indicator device. The device is formed of two small circular discs secured in flat side-by-side relationship at the center thereof with the center of a disc indicating the north pole.

(b) Description of Prior Art

Various compass and time indicator devices using rings are known. For example, such a time indicator device is disclosed in French Patent No. 2,467,437 published in 1981. That particular device utilizes an aperture or a shadow creating member in order to indicate the time of day on a ring. However, it is not meant to indicate the direction of the north pole. Various compasses are known to do this, and most of these compasses utilize metal parts, particularly for the indicating needle and its support. Thus, the needle is greatly affected by any environmental magnetic perturbances thereby causing the needle to give a false indication of the direction of the north pole. These magnetic perturbances may be caused by various elements such as the metallic content of the soil, overhead or burried electrical cables, cold and humidity, or an electrical disturbance in the atmosphere. Another disadvantage of such compasses is that the needle is delicatelly supported and protected by a glass top, if the glass is broken, by dropping the compass on the ground or if a person carrying the compass falls, the needle will also be broken. Still further, such compasses are usually bulky as they require a predetermined thickness in its casing whereby to support needles elevated therein. They also indicate the direction of the magnetic north instead of the geographic north, which can be substantially different.

SUMMARY OF INVENTION

It is therefore a feature of the present invention to provide a solar compass device which substantially overcomes all of the above-mentioned disadvantages of the prior art.

Another feature of the present invention is to provide a solar compass device which is constructed of flat discs of non-metallic material and which may be easily carried in the pocket of an apparel article.

Another feature of the present invention is to provide a compass and time indicator device which indicates the direction of the north pole by the use of the sun and the approximate time of day.

Another feature of the present invention is to provide a compass and time indicator device which is capable of providing an indication of the time of day in many major cities around the globe and which further indicates the date line and the direction of rotation of the earth as viewed from the north pole.

Another feature of the present invention is to provide a solar compass device which can be utilized as a teaching aid to teach a person how he can orient himself, the position of the country he resides in relative to the sun and other countries, an explanation of the cause of night and day including the relationship between movement of the earth and time.

Another feature of the present invention is to provide a compass and time indicator device which is easy and economical to manufacture.

According to the above features, from a broad aspect, the present invention provides a solar compass device comprising a first member having spaced apart markings indicative of time and disposed in a counterclockwise direction in a circular ring pattern therein. A second member is rotatably displaceable with respect to the first member to permit rotational displacement between the first and second members with said members disposed in substantially parallel planes. Indicating means is provided on the second member and aligned on a radius between a center point relative to the ring and the ring. The first member when oriented with one of the markings which is representative of 12 o'clock and aligned substantially in the direction of the sun and the indicating means aligned with a marking indicative of approximately the time of day, the indicating means automatically indicates the approximate direction of the north pole.

BRIEF DESCRIPTION OF THE DRAWINGS

A preferred embodiment of the present invention will now be described with reference to the accompanying drawings in which:

FIG. 1b is a side view of FIG. 1a;

FIG. 2b is a side view of FIG. 2a;

FIG. 3b is a side view of FIG. 3a;

FIG. 4 is a plan view of a still further example of a compass and time indicator device of the present invention; and FIG. 5 is a section view along section lines V—V of FIG. 4.

DESCRIPTION OF PREFERRED EMBODIMENTS

Figure 1A:
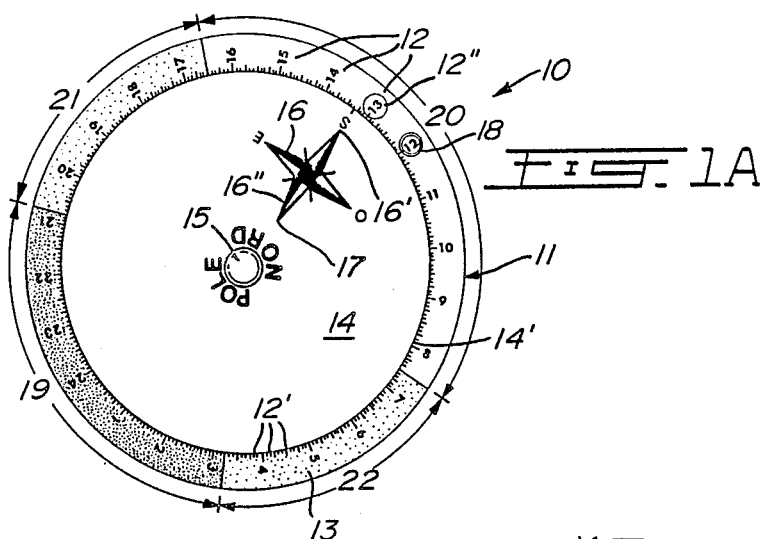
FIG 1a is a plan view of an example of the compass and time indicator device of the present invention.

Referring now to the drawings, and more particularly to FIGS. 1a and 1b, there is shown generally at 10, the compass and time indicator device of the present invention. As herein shown, the device comprises a first member, herein a flat plastic disc 11 having spaced apart markings 12 indicative of time and disposed in a counterclockwise direction in a circular ring pattern 13. A second member or disc 14 is rotatably displaceable with respect to the first member 11 by a connection 15 located at a center point relative to the ring 11. As herein shown, the second member 14 is of a smaller diameter and has its outer periphery 14' located adjacent the inner edge of the ring portion 13 of the first member 11.

Indicating means 16 as herein shown in the form of a compass symbol is oriented with its north/south pole axis 17 aligned on a radius between a center axis 18' or the center connection 15 and the ring portion 13.

As herein shown, the markings 12 are equidistantly spaced numbers disposed about the ring 13 and contain numbers from 1 to 24 inclusively, which are the number of hours in a day and are disposed in a counter-clockwise direction about the ring, as previously mentioned. Further markings 12' may be provided therebetween to indicate various fractions of the hour markings. As also herein shown, the twelve hour marking 18 is readily identifiable from the other numbers and this is done by replacing the number by a colored dot. The 13 hour marking 12" is utilized by the marking 18 during daylight savings time.

In operation, by aligning the south portion 16' of the indicating means 16 with the actual time of day (as shown in FIG. 1 — approximately 13 hours and 25 minutes), and orienting the 12 o'clock marking 18 substantially in line with the sun, the north end portion 16" of the indicator 16 points approximately in the direction of the north pole. Thus, the north pole has been indicated with respect to the location of the sun and the time of day.

As also shown in FIG. 1a, the ring portion 13 has portions thereof of different shading or coloring whereby to indicate the periods of daytime. For example, portion 19 indicates the nightime period, portion 20 indicates the daytime period, portion 21 indicates the dawn period and portion 22 indicates the dusk period. Therefore, a person quickly receives a perception of where he resides in time in a full day's cycle. Also, the dusk and dawn periods indicate to him the variations in the daylight period from the longest day of the year to the shortest day of the year and this is done in approximation.

Figure 2A:
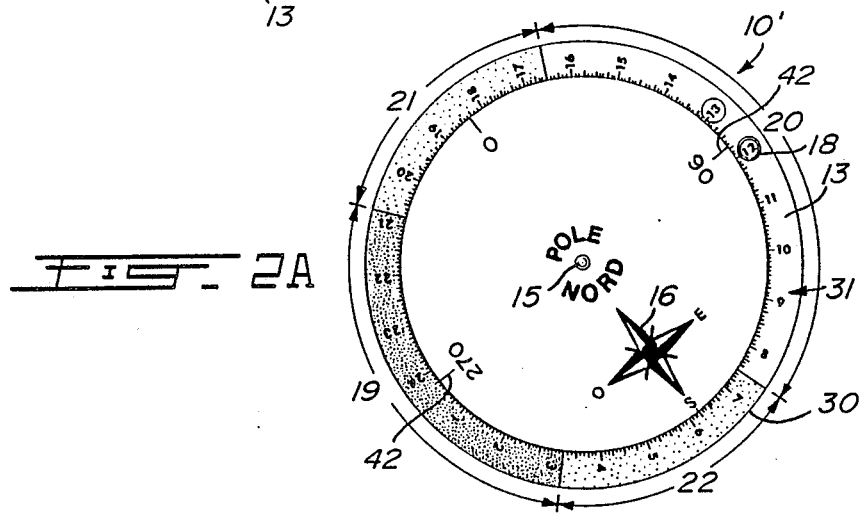
FIG. 2a is a plan view of another example of the compass and time indicator device of the present invention.

Referring now to FIG. 2a, there is shown a slight variation of the compass and time indicator device and, as herein shown, the device 10' comprises two discs, a bottom disc 30 which contains the indicating markings 16 disposed in the same fashion as did the top disc in FIG. 1a, and a top disc 31 which is formed of transparent plastic material. The ring portion 13 as herein shown is provided on the top disc. Accordingly, the discs are herein shown in an inverted configuration but the operation of this compass 10' is the same as compass 10 of FIG. 1a as both discs are rotatably connected at the center thereof by the center connection 15.

Figure 3A:
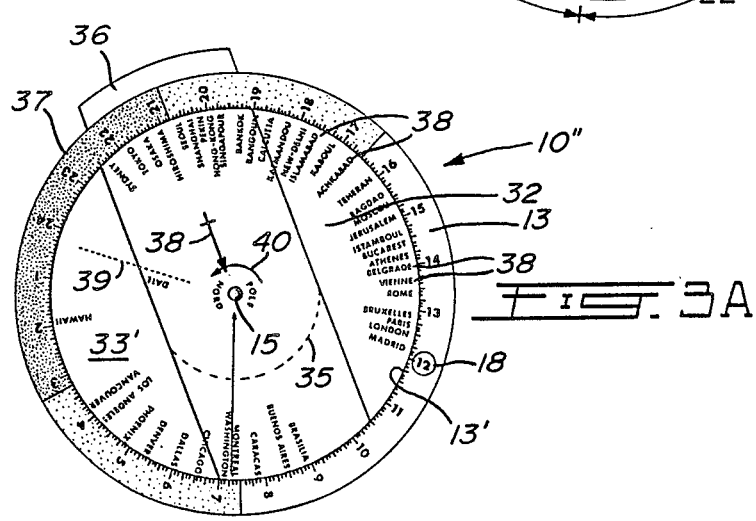
FIG. 3a is a plan view of a still further example of the compass and time indicator device of the present invention.

Referring now to FIGS. 3a and 3b, there is shown a different variation or modification of the compass and time indicator and the device 10" as herein shown comprises a third member 32 connected to the first and second members 33 and 34, respectively. The first member 33 is the member comprising the ring portion 13 with the hour markings 12 thereon. As herein shown, the ring portion 13 is an opaque portion and also having the nightime and daytime zones indicated thereon and its center portion 33' is formed of transparent material. The second member 34 is a strip-like member secured by the connection 15 and is herein shown as formed of transparent plastic material. This member 34 is herein shown as captive between the first member 33 and third member 32 and extending thereacross. However, the member can be terminated beyond the connection 15 such as indicated by phantom lines 35. This strip-like member 34 also has an outer end engaging portion 36 extending beyond the outer circumference 37 of both the first and third disc members and this is utilized for grasping between the fingers to displace the second member on its pivot point or pivot connection 15. An arrow 38 constitutes the indicating means and is located on a radius centrally of the longitudinal axis of the strip-like member 34. As herein shown, both the first and third discs are of substantially the same size.

In the embodiment of FIG. 3a, it can be shown that the third disc is further provided with a set of markings 38 representative of major cities of the world and disposed substantially on radii axes and adjacent the inner peripheral portion 13' of the ring 13. These international city markings are positioned relative to their geographical locations with respect to the north pole. An international date line marking 39 is also positioned relative to the city markings and the north pole to give the perception of the user of his location in time and space relative to the earth when the disc is viewed as it represents the earth from a stationary object looking at the north pole of the earth. The arrow 40 indicates the direction of rotation of the earth.

Referring now to FIGS. 4 and 5, there is shown a still further modification of the preferred embodiment of the compass and time indicator device of the present invention. As herein shown, the device comprises a large base member 50 which has a flat top surface 51. The ring member 13 is herein shown as an independent member rotatably secured in a cavity 52 or on top of the base and having a circumferential gear 53 thereunder engaged with the drive gear train 54 of a clock mechanism 55 located within the base member 50. With this particular embodiment, the ring member 13 is rotated in a clockwise direction the same as would the needles of a clock. Thus, by the time of day on the ring in with the indicator means 41 and placing the stationary base member 50 and the 12 o'clock marking 18 in alignment with the sun, the indicator means points to the north. At the same time one can quickly observe the approximate solar time of day and period of day in various cities around the world. The device also provides the perception of the rotation of the earth as seen from the north pole. In this particular embodiment, the center disc 56 is provided with the markings 38 thereon and there is no need for a central pivot connection as this disc is also held in the cavity 52 in the top wall of the base 50.

It is within the ambit of the present invention to cover any obvious modifications, provided such modifications fall within the scope of the appended claims. As an example, it is also conceivable that some of the embodiments described herein can be incorporated inside a wristwatch, particularly, the embodiment of FIG. 4, which could constitute a different type of wristwatch. Also, degree markings 42, as shown in FIG. 2A, can be printed all around the disc having the indicating means whereby to indicate an angle of direction relative to the north pole.

I claim:

1. A solar compass device comprising a first member having spaced apart markings indicative of time and disposed in a counterclockwise direction in a circular ring pattern thereon, a second member rotatably displaceable with respect to said first member to permit rotational displacement between said first and second members with said members disposed in substantially parallel planes, and a single fixed indicating means on said second member aligned on a radius between a center point relative to said ring, said radius representing a north-south axis with said indicating means being disposed at a south end of said axis, said indicating means when aligned with a marking indicative of approximately the time of day, and said first member when oriented with one of said markings which is representative of 12 o'clock aligned substantially in the direction of the sun, the north end of said axis is automatically aligned in the direction of the north pole.

2. A solar compass device as claimed in claim 1 wherein said second member is rotatably secured to said first member by a connection at said center point, said spaced markings are equidistantly spaced numbers disposed about said ring.

3. A solar compass device as claimed in claim 2 wherein said markings contain numbers from 1 to 24 inclusive and disposed in said counterclockwise direction about said ring.

4. A solar compass device as claimed in claim 3 wherein said 12 or 13 o'clock number is represented by a distinguishing marking readily identifying it from the other numbers.

5. A solar compass device as claimed in claim 4 wherein said 12 o'clock marking is a colored dot marking.

6. A solar compass device as claimed in claim 2 wherein said indicating means is a compass symbol having at least said north-south axis and wherein degree markings are disposed and stationary around said indicating means whereby to indicate an angle of direction relative to the north pole.

7. A solar compass device as claimed in claim 2 wherein said first and second members are flat circular discs, said center point being indicative of the north pole.

8. A solar compass device as claimed in claim 7 wherein said markings contain numbers from 1 to 24 inclusive, said ring having a portion thereof of night time.

9. A solar compass device as claimed in claim 8 wherein said ring is provided with further portions indicative of the sunlight period of daytime and two further portions separating said nightime and sunlight period of daytime to indicate the dawn and dusk periods of a day relative to different seasons.

10. A solar compass device as claimed in claim 2 wherein said device also provides a time indication and wherein there is further provided a third member connected to said first and second members by said connection, said third member having a set of markings along a peripheral portion thereof and disposed adjacent said ring and representative of major cities of the world.

11. A solar compass device as claimed in claim 10 wherein said third member is further provided with a still further marking relative to said set of markings and indicative of the international date line.

12. A solar compass device as claimed in claim 10 wherein said first member is a flat first circular disc, said third member being a backing member having a flat top surface on which said first circular disc is rotatably secured, said discs having a pocket-size dimension.

13. A solar compass device as claimed in claim 12 wherein said second member is a flat second circular disc concentrically disposed with said second disc and also rotatably connected with said third backing member.

14. A solar compass device as claimed in claim 13 wherein said second disc is disposed above said first disc and is of smaller size with said ring of said first disc disposed about the outer circumference of said second disc.

15. A solar compass device as claimed in claim 13 wherein said second disc is disposed under said first disc, said first disc having at least a circumferential portion of transparent material for sighting said indicating means disposed on said second disc thereunder.

16. A solar compass device as claimed in claim 15 wherein said first and second discs are of the same size.

17. A solar compass device as claimed in claim 12 wherein said second member is a flat strip-like member secured by said connection and having an outer end engaging portion protruding outwardly of the circumference of said first and third members to displace said strip-like member on said connection and about said first and third members.

18. A solar compass device as claimed in claim 17 wherein said third member is a flat disc of substantially the same size as said first disc, said first disc being a transparent disc and having an opaque outer band constituting said ring, said spaced markings being equidistantly spaced members and wherein a 12 o'clock one of said numbers is represented by a distinguishing marking, said strip-like member being at least a transparent portion, said third member also being a flat circular disc, said set of markings on said third disc and representative of major cities of the world being visible through said transparent portion of said strip-like member.

19. A solar compass device as claimed in claim 18 wherein said ring is provided with distinguishing portions identifying nightime, daytime, dawn and dusk periods of a day, said device when viewed being representative of the earth as seen from the north pole.

20. A solar compass device as claimed in claim 12 wherein said third member is a large stationary base member having a flat top surface, and an arrow design around said connection indicating the direction of rotation of the earth.

21. A solar compass device as claimed in claim 1 wherein said first member is a ring member rotatably secured to a clock mechanism and rotating clockwise about said second member.

* * * * *